3,174,939
INFRARED EMITTING PHOSPHORS
Lawrence Suchow, Yonkers, N.Y., assignor to International Business Machines Corporation, New York, N.Y., a corporation of New York
Filed May 17, 1963, Ser. No. 281,268
20 Claims. (Cl. 252—301.6)

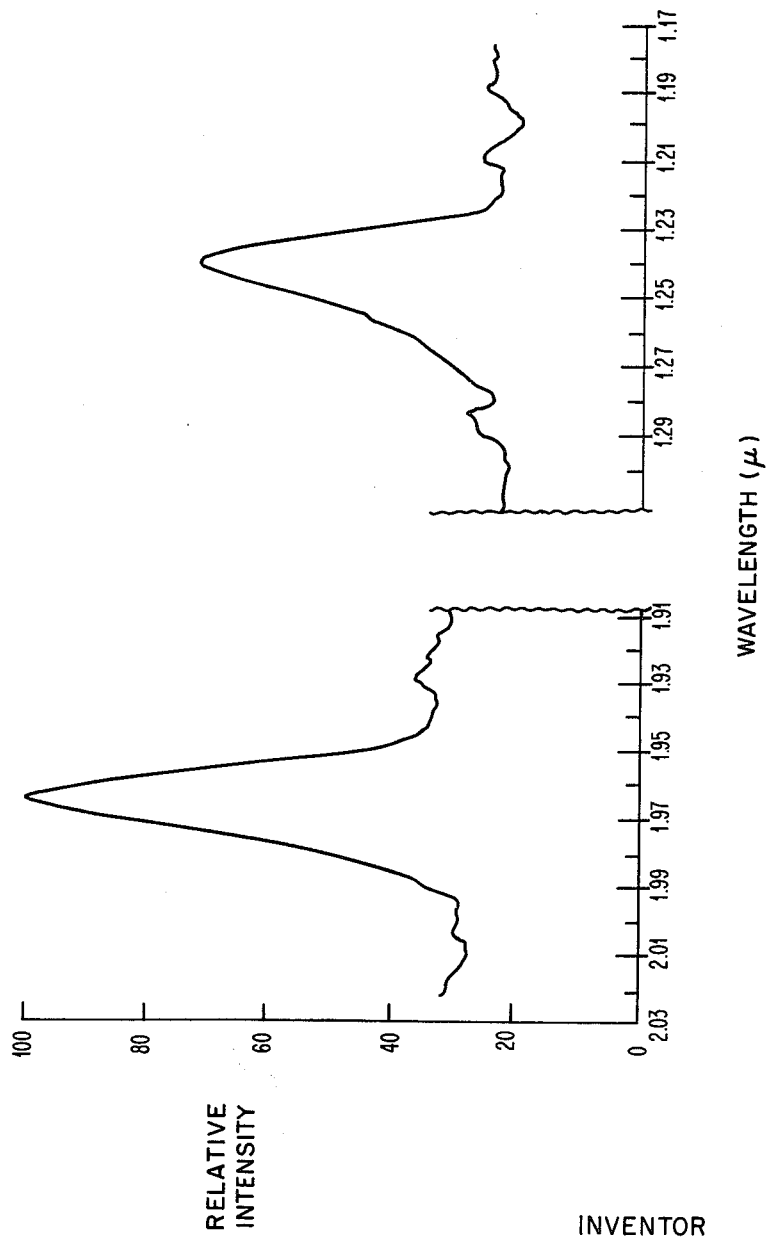

This invention relates to new infrared emitting phosphors and, more particularly, to phosphors having a spinel structure and containing rare earths with the higher atomic numbers and smaller ionic sizes (i.e., Dy, Ho, Er, Tm, Yb, Lu). Specifically, this invention relates to new cadmium rare earth chalcogenides (i.e., cadmium rare earth sulfide or selenide compounds) having a spinel structure. These new compounds either when pure or in solid solutions with $CdIn_2S_4$ are infrared emitting phosphors when excited by wavelengths such as those radiated by a xenon lamp.

The new infrared phosphors are used as a source of narrow band infrared radiation. Each rare earth when it is one of the elements in a spinel structure compound exhibits a different characteristic emission wavelength so that the desired wavelength can be selected simply by selecting the appropriate rare earth. Such narrow band infrared radiation is useful for any application for which monochromator or narrow band filters would otherwise have to be employed. Narrow band infrared radiation is useful, for example, for studying photochemical reactions when it is necessary to determine the effects of different wavelengths and whether perhaps one wavelength causes the reaction to go forward and another wavelength to reverse it.

It is an object of this invention to provide and prepare new cadmium rare earth chalcogenides.

It is another object of this invention to provide and prepare new cadmium rare earth chalcogenides which are infrared emitting phosphors.

It is a further object of this invention to provide and prepare cadmium rare earth sulfide or selenide compounds which have a spinel structure and are infrared emitting phosphors.

It is still another object of this invention to provide and prepare cadmium rare earth chalcogenides having the formula $CdA_2M_4$ wherein A is a rare earth selected from the group consisting of Dy, Ho, Er, Tm, Yb, and Lu and M is a chalcogen selected from the group consisting of S and Se.

It is still a further object of this invention to provide and prepare a cadmium rare earth chalcogenide solid solution system having the formula $$CdIn_{2(1-x)}A_{2x}S_{4(1-x)}M_{4x}$$

where $x$ is less than 1 and greater than 0 (i.e., $1>x>0$) wherein A is a rare earth selected from the group consisting of Dy, Ho, Er, Tm, Yb and Lu and M is a chalcogen selected from the group consisting of S and Se.

The foregoing and other objects, features and advantages of the invention will be apparent from the following more particular description of a preferred embodiment of the invention, as illustrated in the accompanying drawing.

FIG. 1 is an emission spectrum of $CdIn_{1.8}Tm_{0.2}S_4$ powder at 6° K. with xenon lamp excitation.

The present invention relates to new cadmium rare earth chalcogenides which have the formula $CdA_2M_4$ and solid solutions of $CdA_2M_4$ with $CdIn_2S_4$ having the formula $CdIn_{2(1-x)}A_{2x}S_{4(1-x)}M_{4x}$ where $x$ is less than 1 and greater than zero ($1>x>0$) and wherein A is a rare earth selected from the group consisting of Dy, Ho, Er, Tm, Yb and Lu and M is a chalcogen selected from the group consisting of S and Se. These cadmium rare earth chalcogenides either when pure or in solid solutions with $CdIn_2S_4$ have a spinel structure and when excited by radiation from a xenon lamp are infrared emitting phosphors.

The rare earths used in the preparations of these new phosphors are the rare earths with the higher atomic numbers and smaller ionic size i.e. dysprosium, holmium, erbium, thulium, ytterbium and lutecium. The chalcogen used is a Group VI element, i.e., sulfur and selenium.

The cadmium rare earth chalcogenides of the invention are prepared in the following manner: First, the rare earth sulfide or selenide is prepared by reaction at an elevated temperature (approximately 1000° C.) for 2–16 hours in a sealed evacuated quartz tube of rare earth metal turnings or powder with sulfur or selenium in 2:3 molar ratio. This product is then cooled, removed from the tube and ground to a powder. The cadmium rare earth chalcogenide is prepared by solid state reaction for 3–24 hours at 1000°–1200° C. in an evacuated sealed quartz tube of thoroughly mixed equimolar quantities of $A_2M_3$ and CdM. The ternary chalcogenide is then cooled and removed from the tube. The new ternary chalcogenides have been found to have the normal spinel structure which means that all of the rare earth ions are on octahedral sites and the cadmium is on tetrahedral sites.

*Example I*

$CdTm_2S_4$ $Tm_2S_3$ was first prepared by weighing pure rare earth metal turnings and high purity sulfur in a 2:3 molar ratio (e.g., 3.378 gm. Tm+0.962 gm. S) into a five inch long quartz tube with a 10 mm. inside diameter and a 16 mm. outside diameter; sealing them in vacuum, and bringing about the reaction by heating gradually to 1000° C.; this temperature was maintained for an additional five hours before cooling rather slowly in the muffle furnace by cutting off the current. The product was found to be in the shape of the original turnings but changed in color and extremely brittle so that it could be easily ground into powder. The ternary chalcogenides were then prepared by solid state reaction for 16 hours at 1100° C. in an evacuated sealed quartz tube similar to the one described above of equimolar quantities of $Tm_2S_3$ and pure CdS (1.445 gm. of CdS and 4.341 gm. of $Tm_2S_3$). Cooling was again carried out slowly. $CdTm_2S_4$ has a spinel structure and is infrared emitting emitting when excited by radiation from a xenon lamp.

*Example II*

$CdDy_2S_4$

The process of Example I was repeated except that 3.250 gm. of Dy and 4.212 gm. of $Dy_2S_3$ were substituted for the weights of Tm and $Tm_2S_3$ respectively. $CdDy_2S_4$ has a spinel structure and is infrared emitting.

*Example III*

$CdHo_2S_4$

The process of Example I was repeated except that 3.299 gm. of Ho and 4.260 gm. of $Ho_2S_3$ were substituted for the weights of Tm and $Tm_2S_3$ respectively. $CdHo_2S_4$ has a spinel structure and is infrared emitting.

*Example IV*

$CdEr_2S_4$

The process of Example I was repeated except that 3.345 gm. of Er and 4.307 gm. of $Er_2S_3$ were substituted for the weights of Tm and $Tm_2S_3$ respectively. $CdEr_2S_4$ has a spinel structure and is infrared emitting.

*Example V*

$CdYb_2S_4$

The process of Example I was repeated except that 3.461 gm. of Yb and 4.423 gm. of $Yb_2S_3$ were substituted for the weights of Tm and $Tm_2S_3$ respectively. $CdYb_2S_4$ has a spinel structure and is infrared emitting.

*Example VI*

$CdLu_2S_4$

The process of Example I was repeated except that 3.499 gm. of Lu and 4.461 gm. of $Lu_2S_3$ were substituted for the weights of Tm and $Tm_2S_3$ respectively. $CdLu_2S_4$ has a spinel structure and is infrared emitting.

*Example VII*

$CdDy_2Se_4$

The process of Example I was repeated except that 3.250 gm. of Dy and 2.369 gm. of Se were substituted for the weights of Tm and S respectively. In addition, 5.619 gm. of $Dy_2Se_3$ and 1.914 gm. CdSe were substituted for the weights of $Tm_2S_3$ and CdS respectively. $CdDy_2Se_4$ has a spinel structure and is infrared emitting.

*Example VIII*

$CdHo_2Se_4$

The process of Example I was repeated except that 3.299 gm. of Ho and 2.369 gm. of Se were substituted for the weights of Tm and S respectively. In addition, 5.667 gm. of $Ho_2Se_3$ and 1.914 gm. of CdSe were substituted for the weights of $Tm_2S_3$ and CdS respectively. $CdHo_2Se_4$ has a spinel structure and is infrared emitting.

*Example IX*

$CdEr_2Se_4$

The process of Example I was repeated except that 3.345 gm. of Er and 2.369 gm. of Se were substituted for the weights of Tm and S respectively. In addition, 5.714 gm. of $Er_2Se_3$ and 1.914 gm. of CdSe were substituted for the weights of $Tm_2S_3$ and CdS respectively. $CdEr_2Se_4$ has a spinel structure and is infrared emitting.

*Example X*

$CdTm_2Se_4$

The process of Example I was repeated except that 3.379 gm. of Tm and 2.369 gm. of Se were substituted for the weights of Tm and S respectively. In addition, 5.748 gm. of $Tm_2Se_3$ and 1.914 gm. of CdSe were substituted for the weights of $Tm_2S_3$ and CdS respectively. $CdTm_2Se_4$ has a spinel structure and is infrared emitting.

*Example XI*

$CdYb_2Se_4$

The process of Example I was repeated except that 3.461 gm. of Yb and 2.369 gm. of Se were substituted for the weights of Tm and S respectively. In addition, 5.830 gm. of $Yb_2Se_3$ and 1.914 gm. of CdSe were substituted for the weights of $Tm_2S_3$ and CdS respectively. $CdYb_2Se_4$ has a spinel structure and is infrared emitting.

*Example XII*

$CdLu_2Se_4$

The process of Example I was repeated except that 3.499 gm. of Lu and 2.369 gm. of Se were substituted for the weights of Tm and S respectively. In addition, 5.868 gm. of $Lu_2Se_3$ and 1.914 gm. of CdSe were substituted for the weights of $Tm_2S_3$ and CdS respectively. $CdLu_2Se_4$ has a spinel structure and is infrared emitting.

Because the cadmium rare earth chalcogenides ($CdA_2M_4$) have spinel structures, it was found that extensive solid solution between them $CdIn_2S_4$ would occur because the latter is known to crystallize with a spinel structure as well. The solid solutions have the formula $CdIn_{2(1-x)}A_{2x}S_{4(1-x)}M_{4x}$ where $x$ is less than 1 and greater than zero ($1 > x > 0$) and A is a rare earth selected from the group consisting of Dy, Ho, Er, Tm, Yb and Lu and M is a chalcogen selected from the group consisting of S and Se.

Solid solutions having the above formula were prepared by reaction for 3–24 hours at 1000°–1200° C. in evacuated sealed quartz tubes of CdM, $In_2S_3$ and $A_2M_3$ in proportions such that the solid solution produced by the heating lies within the above solid solution formula.

Alternately, the solid solutions were prepared by reaction for 3–24 hours at 1000°–1200° C. in evacuated sealed quartz tubes of $CdIn_2S_4$ with $CdA_2M_4$ in proportions such that the solid solutions produced by heating lies within the above solid solution formula.

The advantages of the solid solution over the pure compound include more intense infrared emission and the ability to grow single crystals from the melt because the melting point of $CdIn_2S_4$ is easily attainable whereas those of $CdA_2M_4$ are not.

*Example XIII*

$CdIn_{1.8}Tm_{0.2}S_4$ 0.722 gm. of CdS, 1.466 gm. of $In_2S_3$ and 0.217 gm. of $Tm_2S_3$ are mixed together thoroughly and the mixture is heated in an evacuated sealed quartz tube (of dimensions set forth previously) for 6 hours at 1150° C. Cooling is carried out rather slowly in the furnace by cutting off the current. The solid solution $CdIn_{1.8}Tm_{0.2}S_4$ has a spinel structure and is an infrared emitting phosphor.

*Example XIV*

$CdIn_{1.8}Er_{0.2}S_{3.6}Se_{0.4}$ 4.233 gm. of $CdIn_2S_4$ and 0.763 gm. of $CdEr_2Se_4$ are mixed together thoroughly and the mixture is heated in an evacuated sealed quartz tube (of dimensions set forth previously) for 8 hours at 1175° C. Cooling is carried out rather slowly in the furnace by cutting off the current. The solid solution $CdIn_{1.8}Er_{0.2}S_{3.6}Se_4$ has a spinel structure and is an infrared emitting phosphor.

Fluorescence in the infrared at 6° K. of a powder sampel of $CdIn_{1.8}Tm_{0.2}S_4$, excited by xenon lamp radiation and detected with a lead sulfide photocell and a Perkin Elmer 112 monochromator is given in FIGURE 1. It will be seen that there is strong emission in the infrared, with rather sharp peaks at $1.97\mu$ and $1.24\mu$. The peak at N$1.97\mu$ is attributed to $Tm^{3+}$. The peak at $1.24\mu$ may be due to a small amount of $Tm^{2+}$. The emission at $1.97\mu$ is seen generally in the preparations in the $CdIn_2S_4$—$CdTm_2S_4$ system, but the $1.24\mu$ peak is missing in preparations containing about 20 mole percent $CdTm_2S_4$ or more. Maximum intensity of emission of the $1.97\mu$ peak is observed over the approximate range 7–60 mole percent $CdTm_2S_4$. $CdTm_2S_4$ itself still emits at this wavelength, whereas $Tm_2S_3$ has been found not to emit at all in the infrared. At trace concentrations of $CdTm_2S_4$ in $CdIn_2S_4$, little or no fluorescence is seen.

Fluorescence has also been observed upon xenon lamp excitation of single crystals preparations. For instance, the emission spectrum of transparent red single crystals obtained from the melt was very similar at 6° K. to that of the powder sample but with an additional small peak at $1.87\mu$. The lattice constants of two of these crystals indicated that the $CdTm_2S_4$ content was 7 and 16 mole percent, respectively, although the starting composition in each case had been 10 mole percent. Variation in composition of melt grown crystals of solid solutions is of course to be expected because of the equilibrium between solid and liquid phases of different and changing compositions.

It has been found in addition that the fluorescence from single crystals may be seen at 77° K. as well as at 6° K., although the emission peaks at the higher temperature are much lower, perhaps broader, and shifted to slightly longer wavelengths. The peaks at 1.97, 1.87, and 1.24μ are shifted to 1.98, 1.88, and 1.26μ, respectively.

The cadmium rare earth chalcogenides (i.e., $CdA_2M_4$) and solid solutions of these compounds with $CdIn_2S_4$ (i.e., $CdIn_{2(1-x)}A_{2x}S_{4(1-x)}M_{4x}$ where $1>x>0$) are infrared emitting phosphors and used in photochemical reactions where narrow bands of radiation are required. For example, the emission wavelength of 1.97μ shown in FIGURE 1 and found alone in solid solutions having the formula $CdIn_{2(1-x)}Tm_{2x}S_4$, where $x>0.2$, is the second harmonic of the stretching frequency of S—H or N—H bonds. Suitable molecules (e.g., cyclopentylmercaptan, ethylamine hydrochloride, etc.) can be decomposed at temperatures considerably below their normal decomposition temperatures by irradiation with infrared of this wavelength.

Thus, this invention relates to new cadmium rare earth chalcogenide infrared emitting phosphors having the formula $CdA_2M_4$ as well as solid solutions of these compounds having the formula $CdIn_{2(1-x)}A_{2x}S_{4(1-x)}M_{4x}$ wherein A is a rare earth selected from the group consisting of Dy, Ho, Er, Tm, Yb and Lu and M is a chalcogen selected from the group consisting of S and Se. These compounds and solid solutions have a spinel structure.

While the invention has been particularly shown and described with reference to preferred embodiments thereof, it will be understood by those skilled in the art that the foregoing and other changes in form and details may be made therein without departing from the spirit and scope of the invention.

What is claimed is:
1. A cadmium rare earth chalcogenide having the formula $CdA_2M_4$ wherein A is a rare earth selected from the group consisting of Dy, Ho, Er, Tm, Yb and Lu and M is a chalcogen selected from the group consisting of S and Se.
2. The cadmium rare earth chalcogenide $CdDy_2S_4$.
3. The cadmium rare earth chalcogenide $CdHo_2S_4$.
4. The cadmium rare earth chalcogenide $CdEr_2S_4$.
5. The cadmium rare earth chalcogenide $CdTm_2S_4$.
6. The cadmium rare earth chalcogenide $CdYb_2S_4$.
7. The cadmium rare earth chalcogenide $CdLu_2S_4$.
8. The cadmium rare earth chalcogenide $CdDy_2Se_4$.
9. The cadmium rare earth chalcogenide $CdHo_2Se_4$.
10. The cadmium rare earth chalcogenide $CdEr_2Se_4$.
11. The cadmium rare earth chalcogenide $CdTm_2Se_4$.
12. The cadmium rare earth chalcogenide $CdYb_2Se_4$.
13. The cadmium rare earth chalcogenide $CdLu_2Se_4$.
14. The process of preparing a cadmium rare earth chalcogenide having the formula $CdA_2M_4$ which comprises:

(1) mixing together in finely divided form equimolar proportions of $A_2M_3$ and CdM;
(2) heating the thus formed mixture in an evacuated quartz tube for 3–24 hours at 1000°–1200° C. and then cooling;

wherein A is a rare earth selected from the group consisting of Dy, Ho, Er, Tm, Yb and Lu and M is a chalcogen selected from the group consisting of S and Se.

15. The process of preparing a cadmium rare earth chalcogenide having the formula $CdA_2M_4$ which comprises:

(1) mixing together in finely divided form A and M in a 2:3 molar ratio;
(2) heating the mixture of A and M to 1000° C. in an evacuated quartz tube, maintaining the 1000° C. temperature for 2–16 hours and then cooling thereby forming $A_2M_3$;
(3) mixing together in finely divided form equimolar proportions of $A_2M_3$ and CdM;
(4) heating the mixture of $A_2M_3$ and CdM in an evacuated quartz tube for 3–24 hours at 1000°–1200° C. and then cooling;

wherein A is a rare earth selected from the group consisting of Dy, Ho, Er, Tm, Yb and Lu and M is a chalcogen selected from the group consisting of S and Se.

16. A cadmium indium rare earth chalcogenide solid solution system having the formula $$CdIn_{2(1-x)}A_{2x}S_{4(1-x)}M_{4x}$$

at values of $x$ less than 1 and greater than 0
wherein A is a rare earth selected from the group consisting of Dy, Ho, Er, Tm, Yb and Lu
and M is a chalcogen selected from the group consisting of S and Se.

17. The cadmium indium rare earth chalcogenide solid solution system having the formula $CdIn_{2(1-x)}Tm_{2x}S_4$ at values of $x$ less than 1 and greater than 0.

18. The rare earth chalcogenide solid solution system having the formula $CdIn_{1.8}Tm_{0.2}S_4$.

19. The process of preparing a rare earth chalcogenide solid solution system having the formula $$CdIn_{2(1-x)}A_{2x}S_{4(1-x)}M_{4x}$$

where $1>x>0$ which comprises:
(1) mixing together in finely divided form CdM, $In_2S_3$ and $A_2M_3$ in proportions such that the solid solution system produced by heating has the above formula;
(2) heating the thus formed mixture in an evacuated quartz for 3–24 hours at 1000°–1200° C. and then cooling;

wherein A is a rare earth selected from the group consisting of Dy, Ho, Er, Tm, Yb and Lu
and M is a chalcogen selected from the group consisting of S and Se.

20. The process of preparing a rare earth chalcogenide solid solution system having the formula $$CdIn_{2(1-x)}A_{2x}S_{4(1-x)}M_{4x}$$

where $1>x>0$ which comprises:
(1) mixing together in finely divided form $CdIn_2S_4$ and $CdA_2M_4$ in proportions such that the solid solution produced by heating has the above formula;
(2) heating the thus formed mixture in an evacuated quartz tube for 3–24 hours at 1000°–1200° C. and then cooling;

wherein A is a rare earth selected from the group consisting of Dy, Ho, Er, Tm, Yb and Lu
and M is a chalcogen selected from the group consisting of S and Se.

References Cited by the Examiner

UNITED STATES PATENTS 3,104,229  9/63  Koelmans et al. _____ 252—301.6

OTHER REFERENCES

Flahant et al.: "Sur une famille de composés de formule générale $A^{II}B_4^{III}S_7$ et de même type cristallin," Comptes Rendus, Tome 252, May 24, 1961, No. 21, pages 3266–7.

MAURICE A. BRINDISI, *Primary Examiner.*